Jan. 8, 1963     G. C. W. JONES ETAL     3,071,998

FACE DRIVING LATHE CENTERS

Filed Dec. 15, 1959

GLYN CEIRIOG WALTERS JONES
ARTHUR LEONARD TICKNER
INVENTORS

BY *Mason, Porter, Diller & Stewart*

ATTORNEYS

United States Patent Office 3,071,998
Patented Jan. 8, 1963

3,071,998
FACE DRIVING LATHE CENTERS
Glyn Ceiriog Walters Jones, 34 Shaftesbury Ave., Long Eaton, and Arthur Leonard Tickner, 25 Woodland Grove, Chilwell, both of Nottingham, England
Filed Dec. 15, 1959, Ser. No. 859,746
4 Claims. (Cl. 82—40)

This invention relates to improvements in face driving centers for lathe headstocks of the kind in which a spring loaded center is located in a member which fits into the headstock spindle, the member carrying a plurality of teeth which are forced into the face of work disposed between the lathe centers by pressure exerted on the work by the tailstock center. With face driving centers as hitherto constructed the teeth have to be forced into the face of the work sufficiently far to drive the work against the torque exerted thereon when the deepest machining cut on the work is being made and the thrust exerted by the tailstock center for this purpose is transmitted through the face driving center to the headstock spindle bearings. It will be seen that the thrust on the headstock spindle bearings is equal to the thrust which it is necessary for the tailstock center to exert on the work, for the latter to be driven when the deepest machining cut is being taken and that this thrust on the headstock spindle bearings will remain constant so that the spindle bearings will be subjected to greater thrust than necessary when lighter machining cuts are being made.

The object of the present invention is to provide a face driving center which will automatically adjust itself so that the thrust exerted on the work by the driving teeth of the center and consequently on the headstock spindle bearing is proportionate to the torque exerted on the work by the cutting tool with a consequent reduction in the load on the headstock spindle bearing and tailstock live center bearings which provides an increased working life for the bearings.

According to this invention the face driving center comprises a spring loaded center mounted in a housing fitting in or on a headstock spindle, a face driving member surrounding the center, teeth on the face driving member and a driving connection between the housing and face driving member consisting of a plurality of balls located in dimples in the end of the housing and engaging in V-shaped radial grooves in the face of a flange on the face driving member. The face driving member is held in position by a cap which is held in position on the housing and the driving connection preferably comprises two balls arranged diametrically opposite to each other and engaging in two diametrically opposed V-shaped slots in the face of the flange on the face driving member. The face of the flange is preferably made conical.

The invention will now be more particularly described with reference to the accompanying drawings in which:

FIG. 1 is a sectional side elevation

FIG. 2 a plan, partly in section, and

FIG. 3 an end view of a lathe driving center constructed according to this invention.

Like numerals indicate like parts throughout the drawings.

Figure 1:
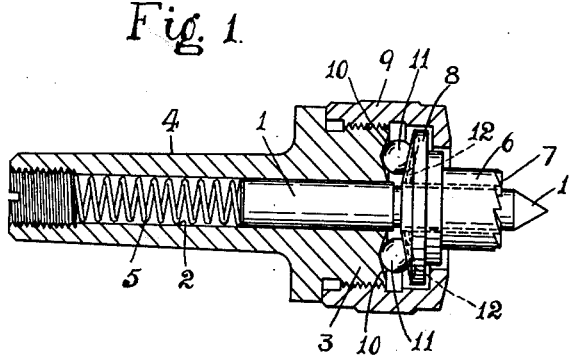
Figure 3:
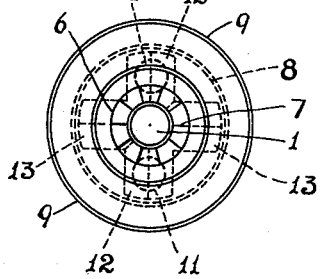
Figure 2:
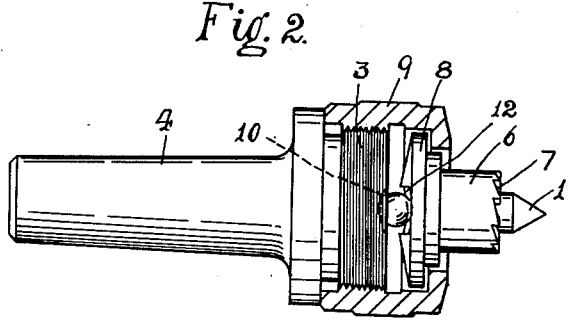
Figure 4:
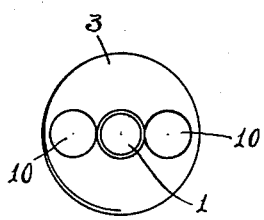
FIG. 4 is an end view of the housing which carries the center showing the dimples in which the driving balls are located.

In carrying out this invention a center 1 is provided and is made a sliding fit in a hole 2 in a housing 3 adapted to screw on a lathe headstock spindle nose or preferably the housing 3 is formed with a taper shank 4 as shown to fit in the taper hole normally provided in a headstock spindle. The center 1 is mounted in the housing 3 so that when the latter is in position in or on the spindle, the axis of the center 1 is co-axial with that of the spindle. The center 1 projects a suitable distance from its hole 2 in the housing and is normally held in this position by a spring 5.

Disposed on the outer end of the center 1 is a face driving member which consists of a sleeve 6 slightly larger in bore than the diameter of the center 1. The outer end of the sleeve 6 is provided with teeth 7 or serrations adapted to cut into the face of work on the center 1 to drive the work. The inner end of the sleeve 6 is formed with a flange 8 and the face driving member is held captive to the housing 3 by a cap 9 which screws on to the housing 3 and embraces the flange 8 whilst permitting movement of the flange relatively to the housing.

In order to provide a driving connection between the housing 3 and the face driving member the following arrangement is adopted. Two diametrically opposed dimples 10 are provided in the outer end of the housing 3 and a hardened steel ball 11 is located in each dimple. The balls 11 also engage in diametrically opposed V-shaped grooves 12 in the inner face of the flange 8 on the face driving member.

The inner face of the flange 8 is preferably made conical to provide for movement of the face driving member so that the driving end of the sleeve 6 thereof can adjust itself to the face of a work piece when on the center 1 if the face is out of truth with the headstock spindle axis.

In operation, work is placed between the centers in a lathe and pressure exerted on the work by the tailstock center to move the headstock center 1 into its housing against the action of its spring 5 and until the teeth 7 on the face driving member have cut into the face of the work sufficiently to drive the latter. When torque is applied to the work piece, when a machining cut is being taken, it tends to turn the face driving member. Any turning movement causes the balls 11 to ride up the inclined faces of the dimples and V-shaped grooves causing movement of the face driving member towards the work piece to exert greater pressure thereon to drive it. As a result the pressure exerted on the work and consequently on the headstock spindle bearings will vary according to the torque exerted on the work piece by the cutting tool, which will depend on the depth of cut and the penetration of the driving teeth 7 does not exceed that necessary to drive against the cutting load and therefore the work piece and indentations are of a minimum depth.

Figure 5:
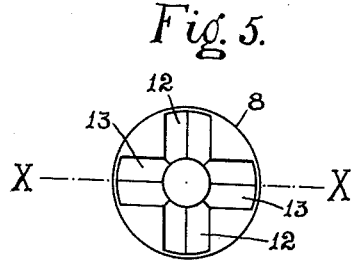
FIG. 5 is an elevation of the face driving member showing the radial grooves therein in which the driving balls are located and FIG. 6 is a sectional plan on the line XX of FIG. 5.

In the preferred construction two pairs of V-shaped grooves 12, 13, see FIG. 5, are provided and the angle between the sides of the grooves of one pair 12 is less than the angle between the sides of the other pair 13. The balls 11 may be placed in either pair of grooves as desired and it will be seen that with the same angular movement of the face driving member about its axis, one pair of grooves will provide a greater axial movement of the face driving member than the other pair.

The cap 9 on the housing 3 retains the face driving member captive to the housing 3 and whilst it allows for a certain amount of axial movement of the face driving member it prevents it moving sufficiently for the balls 11 to become disengaged from the dimples 10 and V-shaped grooves in which the balls 11 are located.

Figure 7:
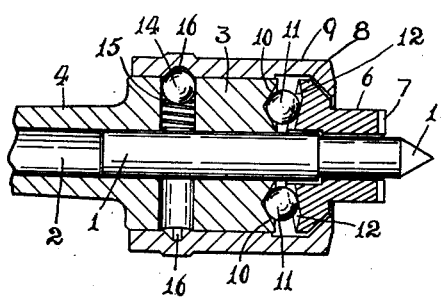
FIG. 7 is a sectional elevation showing an alternative method of holding the cap in position on the head.
Figure 6:
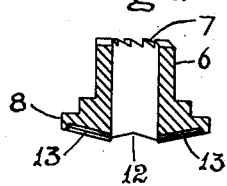

In an alternative construction shown in FIG. 7 the cap 9 is a sliding fit on the housing 3 and is held in position thereon by a spring pressed ball 14 located in a hole 15 in the housing 3 and engaging in a groove 16 in the cap 9.

What we claim is:

1. A face driving center comprising in combination a body for attachment to a lathe spindle, a spring loaded center therein, a work driving member loosely mounted on the center, teeth on the outer end of the driving member, a conical face on the inner end of the driving member, circumferentially spaced V-shaped grooves in the conical face, dimples in the body part, balls in the dimples and grooves forming a work driving connection between the body part and work driving member, and a cap holding the work driving member captive to the body part.

2. A face driving center according to claim 1 having two pairs of oppositely disposed V-shaped grooves in the conical face of the work driving member, the base angle of one pair of grooves being greater than that of the other pair of grooves.

3. A face driving center according to claim 1 in which the cap is held in position on the housing by screwing it thereon.

4. A face driving center according to claim 1 in which the cap is a sliding fit on the housing and is retained in position by a spring pressed ball in one part engaging in a groove in the other part.

References Cited in the file of this patent

UNITED STATES PATENTS

| | | |
|---|---|---|
| 1,595,205 | McClain | Aug. 10, 1926 |
| 1,868,594 | Black | July 26, 1932 |
| 2,397,025 | McBlane | Mar. 19, 1946 |
| 2,897,708 | Kostyrka | Aug. 4, 1959 |

FOREIGN PATENTS

| | | |
|---|---|---|
| 841,672 | Germany | July 8, 1949 |
| 1,012,801 | Germany | July 25, 1957 |